United States Patent [19]

Johnson

[11] Patent Number: 4,503,563
[45] Date of Patent: Mar. 5, 1985

[54] ELECTRICAL DEVICE IN A BUOYANT, WATERTIGHT HOUSING

[75] Inventor: Bruce R. Johnson, Petaluma, Calif.

[73] Assignee: Jandy Industries, San Rafael, Calif.

[21] Appl. No.: 513,602

[22] Filed: Jul. 14, 1983

[51] Int. Cl.³ .................. H04B 1/08; F21L 11/00; F21V 31/00; G01K 1/14
[52] U.S. Cl. .................. 455/351; 362/158; 362/267; 374/208; 441/16; 455/344
[58] Field of Search .......... 455/95, 99, 128, 344, 455/347, 351; 340/815.15, 815.18, 815.2; 174/52 S; 374/141, 208, 156; 362/158, 267; 441/11-13, 16

[56] References Cited
U.S. PATENT DOCUMENTS

| | | | |
|---|---|---|---|
| 1,849,666 | 3/1932 | Frantz | 374/208 |
| 2,019,221 | 10/1935 | Hastings | 374/208 |
| 2,053,591 | 9/1936 | Wiley | 340/815.15 |
| 3,162,813 | 12/1964 | Piccinini | 455/351 |
| 3,612,852 | 10/1971 | Bogossian | 362/267 |
| 3,617,733 | 11/1971 | Adams | 362/267 |
| 3,714,412 | 1/1973 | Franklin | 362/158 |
| 3,794,825 | 2/1974 | Krupansky | 362/158 |
| 4,225,965 | 9/1980 | Baugh | 455/351 |
| 4,321,433 | 3/1982 | King | 455/351 |

*Primary Examiner*—Marc E. Bookbinder
*Attorney, Agent, or Firm*—Melvin R. Stidham

[57] ABSTRACT

An electrical device in a buoyant, watertight housing, with electrical circuitry, including a battery, to illuminate an incandescent lamp to project either dispersed light or a beam through the translucent bottom of the housing, and to power a radio, as well as a water temperature thermometer. A handle is provided so that the device may be used as a portable lantern and/or radio.

7 Claims, 4 Drawing Figures

ELECTRICAL DEVICE IN A BUOYANT, WATERTIGHT HOUSING

BACKGROUND OF THE INVENTION

Hot tubs or spas, wherein water in a relatively small vessel is circulated and heated to elevated temperatures, have come into considerable popularity in recent years. The spas are often used in the evening to provide relaxation after a day's work, but in general, they are not provided with underwater lights. Therefore, many people carry flashlights for safety in stepping into and out of the water, and to see if there are any foreign objects on the bottom. In addition, because of the elevated temperatures to which these spas are heated, usually above 100° Fahrenheit, it is highly advantageous to have a thermometer which enables one to determine the water temperature at night. Further, in connection with water sports generally, there is demand for electrical devices, such as lanterns or radios which are buoyant and watertight.

OBJECTS OF THE INVENTION

It is an object of this invention to provide portable and buoyant means for illuminating underwater surfaces.

It is a further object of this invention to provide an illuminated thermometer for reading water temperature at night.

It is a further object of this invention to provide a floating lantern, radio or casette deck, or a combination thereof.

Other objects, and advantages of this invention will become apparent from the description to follow, particularly when read in conjunction with the accompanying drawing.

SUMMARY OF THE INVENTION

In carrying out this invention, there is provided a buoyant, watertight housing within which is contained electrical circuitry, including at least one battery. A translucent lens depends from the housing and an incandescent bulb within the lens is energized by the battery to illuminate, through the water, surfaces below. A temperature probe also depending from the undersurface of the housing is connected to a temperature readout or thermometer, which also is illuminated so that the water temperature is always clearly visible. A radio, and even a casette deck may also be contained within the housing. A handle formed on the housing enables it to be used as a portable lantern and radio. The housing is made of two parts that snap together with watertight seals between them. A reversible reflector enables the lamp to provide a depressed light or a fairly concentrated beam.

DESCRIPTION OF A PREFERRED EMBODIMENT

Figure 3:
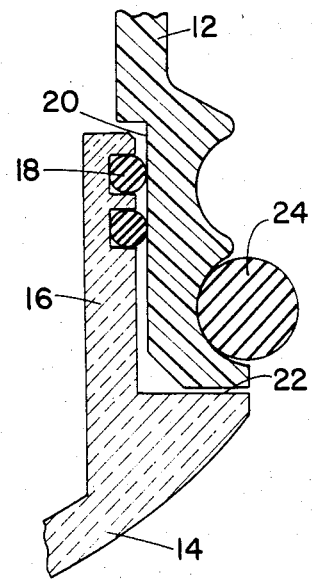
FIGS. 3 and 4 are enlarged partial section views showing the watertight closure.
Figure 4:
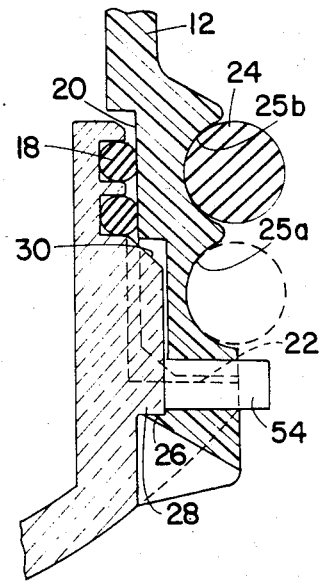

Referring now to the drawings with greater particularity, the buoyant, battery operated device 10 of this invention comprises a hollow housing 12, preferably circular, with a spherical, translucent lens 14 depending therefrom. As shown in detail in FIGS. 3 and 4, the domed lens 14 has a cylindrical sleeve extension 16 carrying sealing means thereon, such as the O-rings 18 shown to seal against the opposing cylindrical surface 20 of the housing 12 in which it nests, to render the structure watertight, forming a hollow, buoyant structure. A radial shoulder 22 engages the annular edge of the housing 12 to define the fully sealed position of the domed lens 14, in which position hook or latch members 26 which depend from the cylindrical portion 20 of the housing 12 at diametrically opposite sides thereof, engage under complementary ears or lugs 20 on the domed lens 14 to prevent separation thereof. A large O-ring 24 that functions as a bumper to protect the housing 12, is stretched around the depending portion 20 of the housing 12 so that, when in the groove 25a, as shown in FIG. 4, it also functions to constrain the latches 26 against release and ensure the continued watertight integrity of the structure 10. In placing the lens 14, the hooks or latches 26 are simply cammed outward by the sloping surfaces 30 on the lugs 28, such outward movement being enabled by shifting the bumper restraint 24 to the upper groove 25b, as shown in FIG. 4.

Figure 2:
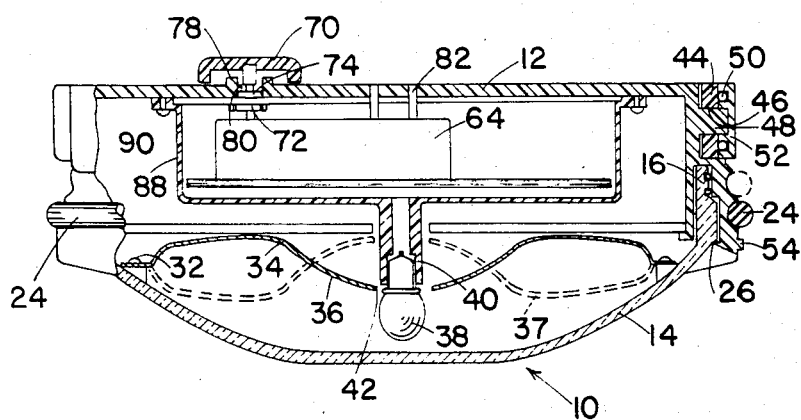
FIG. 2 is a section view taken through the floating device.

Secured across the dome-like lens 14, as by means of mounting screws 32 (FIG. 2) is a generally circular reflector 34 including a generally spherical central portion 36. A light bulb 38 carried in a cylindrical socket 40 extends through a central opening 42 in the reflector dome 36. As shown, the reflector is reversible so that when positioned as shown in solid lines, the domed portion 36 is convex to disperse the light in a wide pattern for broad area or underwater illumination. With the reflector 34 reversed, as shown in phantom, the now concave portion 36 concentrates the light rays in a beam to enable use of the device 10 as a flashlight. In addition, the outer portions 37 may be somewhat concave so that there is also some dispersal. Hence, the lens closure 14 may simply be removed from the housing shell 12, as previously described, and the reflector 34 reversed as desired.

Figure 1:
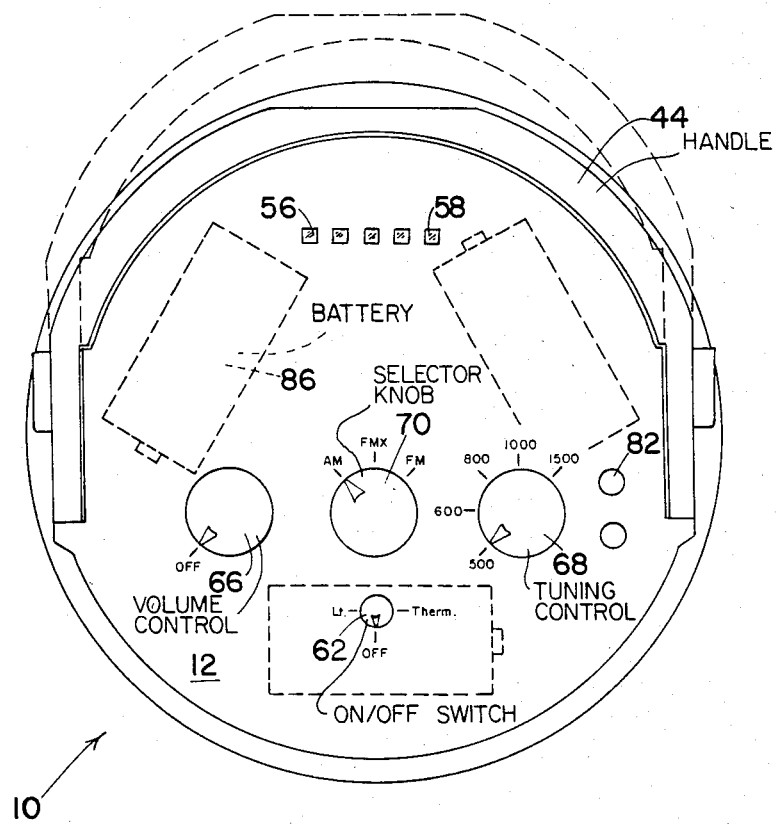
FIG. 1 is a top plan view of a floating lantern and radio embodying features of this invention.

A generally U-shaped, semi-annular handle 44 is provided with slots 46 (FIG. 2) near the ends thereof to receive stub shafts 48 extending from diametrically opposite sides of the housing 12, so that the handle may be both extended, as shown in phantom in FIG. 1, and pivoted in any position, whether retracted or extended. Suitable, friction members, such as O-rings 50 which are carried on the retainers 52, hold the handle 44 in any selected position.

Also exposed at the bottom of the structure 10 is a temperature probe 54 that is electrically connected to a series of temperature read out devices 56 which are clearly readable on a cover of housing 12. The temperature display 56 may simply comprise a series of buttons each of which is illuminated at a given temperature so that the water temperature is always readable, even at night. This is of considerable importance because of the elevated temperatures, often in excess of 100° Fahrenheit, at which spas are operated. In addition, a maximum temperature indicator 58 may be caused to blink to indicate temperature at a maximum safe level of, say, 105° Fahrenheit. An on-off switch 62 is provided on the cover 12 to illuminate both light bulb 38 and thermometer 56 and 58.

A radio 64 is also carried in the housing 12 with volume control knob 66, tuning knob 68 and A.M.-F.M. selector knob 70, all mounted on shafts 72 that extend through the cover of housing 12 (FIG. 3) with suitable seals 74 being provided to maintain the watertight integrity of the device 10. In addition, depending flanges 76 on the knobs 66, 68 and 70, together with annular shoulders 78 around the shaft openings 80 in the housing 12, prevent a direct leak path to the openings 80. Standard jacks 82 are encapsulated in a water barrer material to receive ear phones or even speakers without fear of water damage. It is also contemplated that provision be made for a casette tape player.

In assembly, batteries 86 (FIG. 1), the light 38 and the radio 64, with suitable wiring, may be mounted in a sub-housing 88, which in turn, is secured at 90 to the housing 12.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A buoyant, watertight, housed, electrical device comprising:
    a housing shell;
    electrically energized means in said housing shell;
    at least one battery in said housing shell electrically connected to said electrically energized means;
    a closure member;
    interengagable, outer and inner nesting extensions on said shell and closure member, respectively;
    a resilient seal ring interposed and sealing between said extensions;
    interlocking means on said extensions engaged to prevent separation thereof;
    the outer one of said nesting extensions being movable outward to enable said interlocking means to disengage; and
    restraining means around said extensions operative in a first position to enable said outward movement and in a second position to prevent said outward movement.

2. The device defined by claim 1 wherein said electrically energized means includes a radio;
    control shafts on said radio extending through said housing shell; and
    means for watertight sealing around said control shafts.

3. The device defined by claim 1 wherein said electrically energized means includes:
    an incandescent bulb;
    said device also including:
    a reflector plate; said bulb extending through said reflector plate; and said closure member being formed of a translucent material.

4. The device defined by claim 3 wherein:
    a central portion of said reflector plate receives said bulb and is substantially spherical with a concave side and a convex side; and
    means for mounting said reflector plate in said housing shell with a selected one of said sides disposed outward.

5. The device defined by claim 1 including:
    a temperature probe in said housing shell extending outward thereof;
    a temperature viewing display controlled by said probe on said housing shell.

6. The device defined by claim 1 wherein:
    said housing shell and closure member are circular and said nesting extensions are cylindrical;
    said interlocking means includes at least two hook-like latches on the outer one of said nesting extensions and
    at least two complementary ears on the inner one of said nesting extensions engageable by said hook-like latches;
    said restraining means includes first and second generally parallel grooves around the outside of said outer extension and;
    a resilient restraining ring stretched around said outer extension and positioned selectively in one of said grooves;
    said restraining ring, when in said first groove functioning to prevent release of said latches and when in said second groove functioning to enable release of said latches and subsequent latching action.

7. The device defined by claim 6 including:
    a pair of stub shafts on opposite sides of said housing shell;
    a generally semi-annular handle snugly embracing said shell; and
    means forming slots in the ends of said hangle receiving said stub shafts to enable radial and pivotal movement thereof.

* * * * *